(12) United States Patent
Hishida et al.

(10) Patent No.: US 12,291,033 B2
(45) Date of Patent: May 6, 2025

(54) RECORDING METHOD AND RECORDING APPARATUS

(71) Applicant: SEIKO EPSON CORPORATION, Tokyo (JP)

(72) Inventors: Yuko Hishida, Matsumoto (JP); Yusuke Mizutaki, Shiojiri (JP); Miki Uchida, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 197 days.

(21) Appl. No.: 18/183,409

(22) Filed: Mar. 14, 2023

(65) Prior Publication Data
US 2023/0294405 A1    Sep. 21, 2023

(30) Foreign Application Priority Data

Mar. 15, 2022 (JP) ................... 2022-040314

(51) Int. Cl.
*B41J 2/155* (2006.01)
*B41J 2/21* (2006.01)
*B41J 2/14* (2006.01)

(52) U.S. Cl.
CPC ............. *B41J 2/155* (2013.01); *B41J 2/2107* (2013.01); *B41J 2002/14467* (2013.01)

(58) Field of Classification Search
CPC ........ B41J 2/155; B41J 2/2107; B41J 2/2146; B41J 2202/21
See application file for complete search history.

(56) References Cited

U.S. PATENT DOCUMENTS

| | | | | |
|---|---|---|---|---|
| 9,676,191 | B2* | 6/2017 | Ohashi | B41J 2/165 |
| 2013/0278691 | A1* | 10/2013 | Nomura | B41J 11/00214 |
| | | | | 347/102 |
| 2019/0100671 | A1* | 4/2019 | Morinaga | C09D 11/037 |
| 2019/0291473 | A1* | 9/2019 | Okuda | B41M 5/0023 |
| 2021/0283916 | A1* | 9/2021 | Nakamura | B41J 2/16552 |

FOREIGN PATENT DOCUMENTS

JP      2017-213799 A     12/2017

* cited by examiner

*Primary Examiner* — Scott A Richmond
(74) *Attorney, Agent, or Firm* — Harness, Dickey & Pierce, P.L.C.

(57) ABSTRACT

A recording method comprises a discharging step of discharging a first ink and a second ink from a line head having a length equal to or longer than a recording width of a recording medium and allowing the inks to adhere to the recording medium, wherein the line head includes a plurality of unit heads aligned in the recording width direction of the recording medium and includes portions having different inter-nozzle distances in the scanning direction of a first nozzle that discharges the first ink and a second nozzle that discharges the second ink, and the first ink and the second ink contain color materials and inorganic oxide particles, and the color materials have compositions different from each other.

14 Claims, 3 Drawing Sheets

RECORDING METHOD AND RECORDING APPARATUS

The present application is based on, and claims priority from JP Application Serial Number 2022-040314, filed Mar. 15, 2022, the disclosure of which is hereby incorporated by reference herein in its entirety.

BACKGROUND

1. Technical Field

The present disclosure relates to a recording method and a recording apparatus.

2. Related Art

An ink jet recording method can record high-definition images with a relatively simple apparatus, and has made rapid progress in each field. Especially, various investigations have been made about image quality and the like. For example, Japanese Unexamined Patent Application Publication No. 2017-213799 discloses a recording method using a predetermined aqueous ink for the purpose of recording images with no conspicuous connecting streaks and with excellent uniformity and color development when a recording apparatus having a line head is used.

However, it has been found that in such a known method, when a recorded matter is viewed in a width direction crossing the scanning direction, color differences depending on the positions occur.

SUMMARY

The present disclosure is a recording method comprising a discharging step of discharging a first ink and a second ink from a line head having a length equal to or longer than the recording width of a recording medium and allowing the inks to adhere to the recording medium, in which the line head includes a plurality of unit heads aligned in the recording width direction of the recording medium and includes portions having different inter-nozzle distances in the scanning direction of a first nozzle that discharges the first ink and a second nozzle that discharges the second ink, the first ink and the second ink contain color materials and inorganic oxide particles, and the color materials have compositions different from each other.

The present disclosure is a recording apparatus comprising a line head having a length equal to or longer than the recording width of a recording medium, a first ink, and a second ink, in which the line head includes a plurality of unit heads aligned in the recording width direction of the recording medium and includes portions having different inter-nozzle distances ink in the scanning direction of a first nozzle that discharges the first ink and a second nozzle that discharges the second, the first ink and the second ink contain color materials and inorganic oxide particles, and the color materials have compositions different from each other.

DESCRIPTION OF EXEMPLARY EMBODIMENTS

Figure 1:
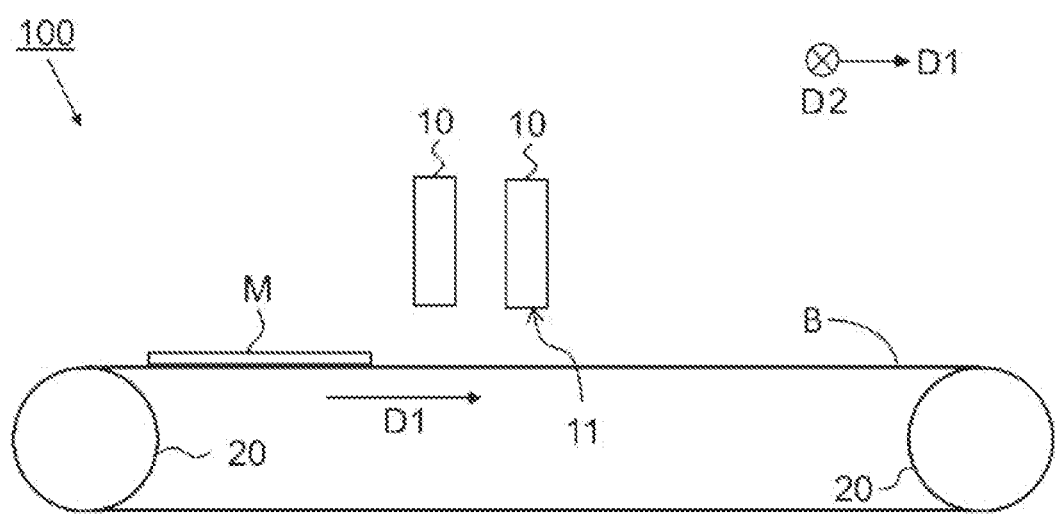
FIG. 1 is a schematic cross-sectional view of a recording apparatus that can be used in the recording method of the present disclosure.

Embodiments of the present disclosure (hereinafter, referred to as the present embodiment) will now be described in detail while referring to a drawing as needed, but the present disclosure is not limited thereto and can be variously modified without departing from the gist. Incidentally, in the drawings, the same elements are denoted by the same reference signs, and overlapping descriptions are omitted. Positional relationships, such as top, bottom, left, and right, are based the positional relationships shown in the drawings unless otherwise specified. The dimensional ratios of the drawings are not limited to those shown in the drawings.

1. Recording Method

The recording method of the present embodiment comprises a discharging step of discharging a first ink and a second ink from a line head having a length equal to or longer than the recording width of a recording medium and allowing the inks to adhere to the recording medium, wherein the line head includes a plurality of unit heads aligned in the recording width direction of the recording medium and includes portions having different inter-nozzle distances in the scanning direction of a first nozzle that discharges the first ink and a second nozzle that discharges the second ink, the first ink and the second ink contain color materials and inorganic oxide particles, and the color materials have compositions different from each other.

Since a line head 10 is generally constituted by aligning a plurality of unit heads 12 in the width direction (see FIG. 3A), a joint 13 is inevitably generated between the unit heads 12. It is known that when a recorded matter is viewed from the width direction, the recording concentration at the portion of the joint 13 varies and is observed as streaks. This is because that when a plurality of unit heads 12 are aligned, the positions of the unit heads 12 are not correctly adjusted in the width direction, and the distances between the nozzles of the unit heads 12 in the width direction cannot be correctly adjusted at the joints 13.

Against such a streak due to a difference in concentration at the portion of a joint 13, for example, a method for reducing the concentration unevenness by image processing technique or the like is known.

Recently, the present inventors have diligently studied and have found that in addition to the streak due to the concentration unevenness, a color difference is also generated at the portion of a joint 13 in some cases. Although the reason of generating such a color difference is not specifically defined, the reason for this is believed to be that when a color is formed from multiple inks, portions showing different time differences until adhesion of each ink to a recording medium can be generated.

Figure 2A:
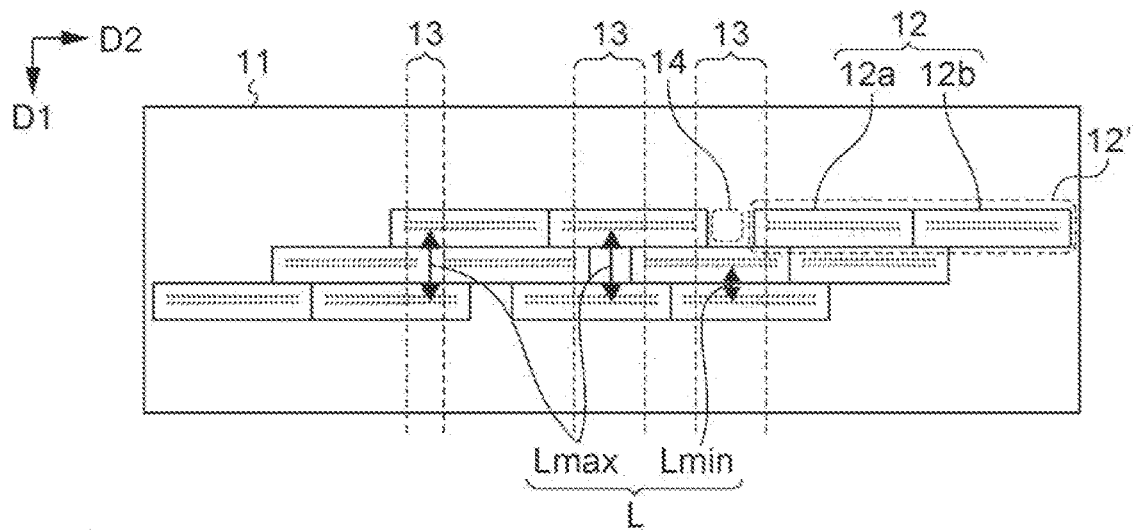
FIG. 2A is a diagram showing a first A example of the nozzle face of an ink jet head including portions having different inter-nozzle distances.
Figure 2B:
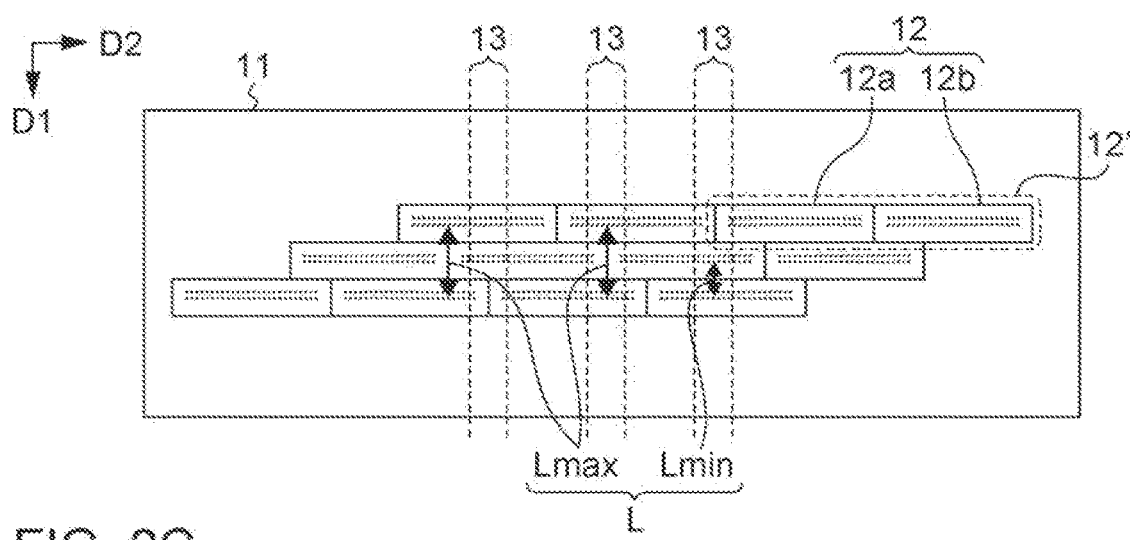
FIG. 2B is a diagram showing a first B example of the nozzle face of an ink jet head including portions having different inter-nozzle distances.
Figure 2C:
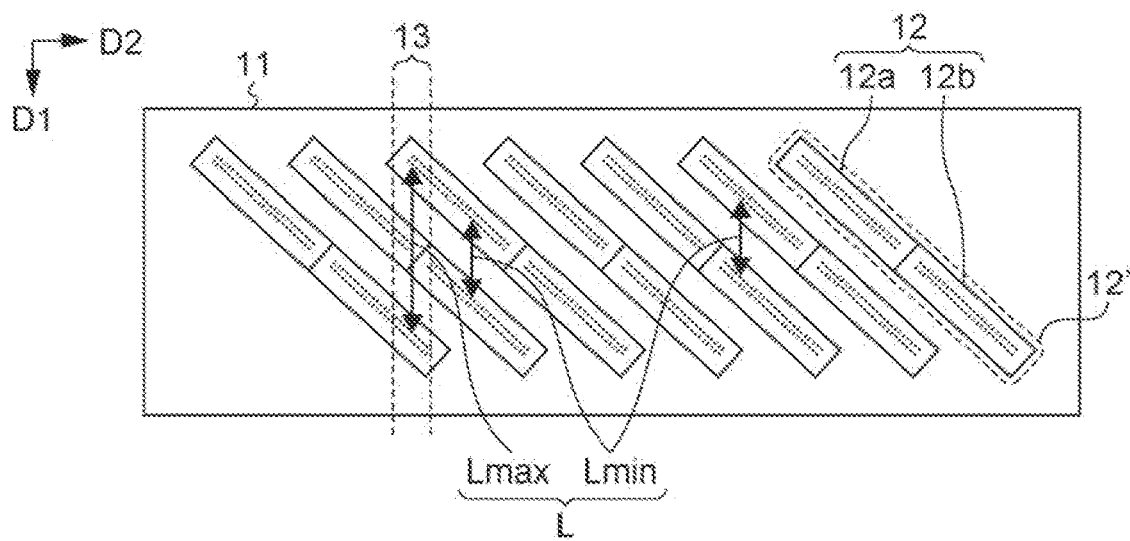
FIG. 2C is a diagram showing a first C example of the nozzle face of an ink jet head including portions having different inter-nozzle distances.

In the portions of joints 13, a portion in which the distance Lmin between a unit head 12*a* and a unit head 12*b* is short and a portion in which the distance Lmax between a unit head 12*a* and a unit head 12*b* is long may be generated in the scanning direction (FIGS. 2A to 2C). If thus there are portions in which the distances L between the unit head 12*a* and the unit head 12*b* are different from each other in the scanning direction, portions showing different time differences from the landing of former ink on a recording medium to the landing of later ink may be generated when viewed in the width direction. Consequently, when viewed in the width direction, a portion having a color formed by landing of the later ink after the penetration of the former ink into the recording medium proceeded and a portion having a color formed by landing of the later ink before the penetration of the former ink into the recording medium are generated, which is presumed to be the cause of a color difference. In other words, when colors are formed by allowing two inks to penetrate sequentially or simultaneously into a recording medium, a difference is generated between the formed colors due to the difference in the penetration states of the two inks, and it is presumed that a similar phenomenon has occurred.

Figure 3A:
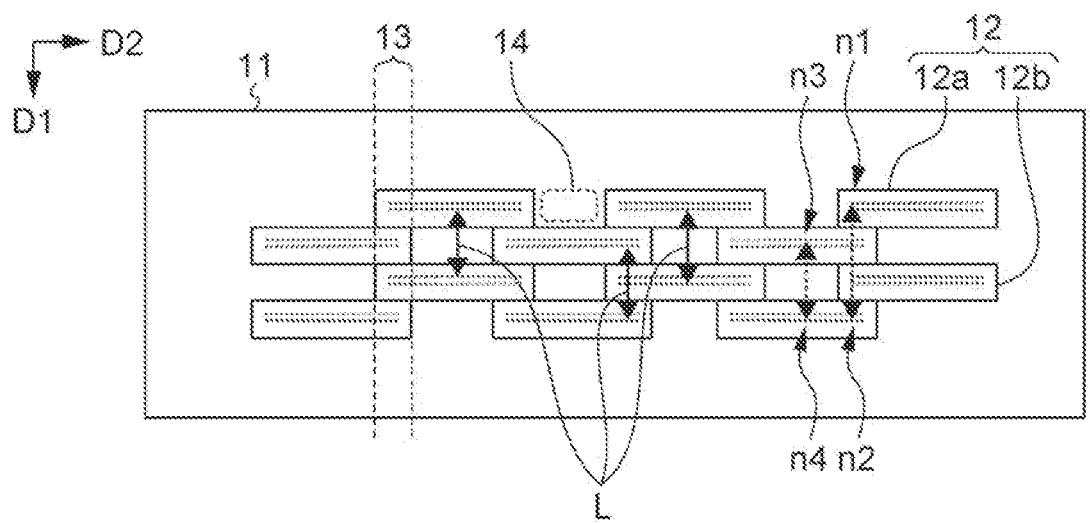
FIG. 3A is a diagram showing a second A example of the nozzle face of an ink jet head not including portions having different inter-nozzle distances.
Figure 3B:
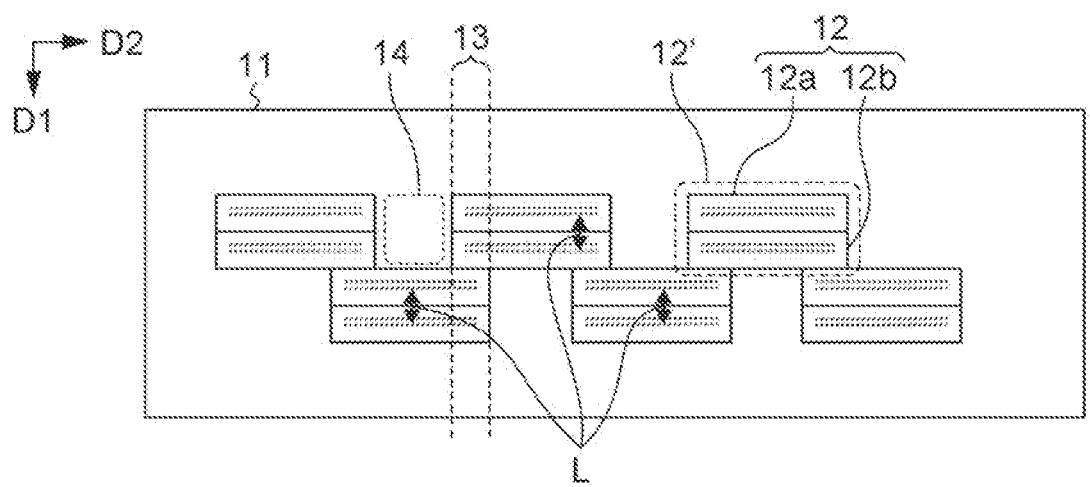
FIG. 3B is a diagram showing a second B example of the nozzle face of an ink jet head not including portions having different inter-nozzle distances.
Figure 3C:
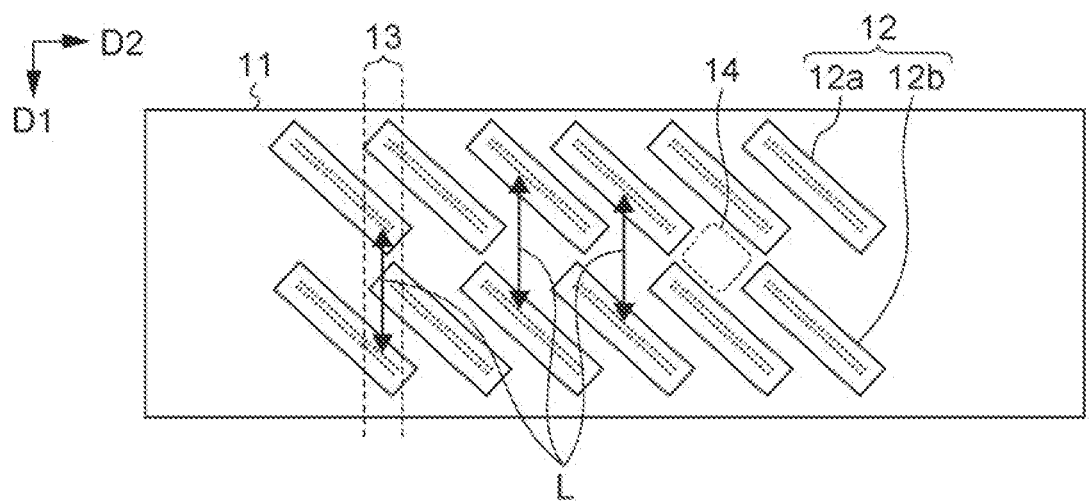
FIG. 3C is a diagram showing a second C example of the nozzle face of an ink jet head not including portions having different inter-nozzle distances.

On the other hand, it is also conceivable to arrange unit heads 12 so as not to generate a portion in which the distance Lmin between a unit head 12*a* and a unit head 12*b* is short and a portion in which the distance Lmax between a unit head 12*a* and a unit head 12*b* is long (FIGS. 3A to 3C). However, in such arrangement, relatively wide gaps 14 in which no unit heads are arranged exist. Accordingly, in order to secure a certain number of nozzles in the nozzle face 11 of a line head, the head itself must be designed large, and increasing in size of the recording apparatus is also caused.

In other words, when the line head is desired to be configured as small as possible, since a portion in which the distance Lmin between a unit head 12*a* and a unit head 12*b* is short and a portion in which the distance Lmax between a unit head 12*a* and a unit head 12*b* is long are generated, the above-mentioned color difference may be generated. In particular, when the size of the line head in the scanning direction is desired to be reduced, the above-mentioned color difference may be generated.

Especially, in the case of a line printer, since adhesion of ink to a recorded matter is accomplished by one pass, the above-mentioned color difference is particularly conspicuous. In the case of a serial printer, even if a color difference has occurred due to the configuration of the head, since the adhesion of ink is performed distributedly by multiple passes, the color difference due to the configuration of the head becomes inconspicuous.

Since such a color difference is due to the difference in the penetration state, the difference cannot be reduced by image processing technique, unlike the concentration unevenness. Accordingly, in the present embodiment, an inorganic oxide particle is used to allow an ink to contain the inorganic oxide particle, and thereby the penetration rates of multiple inks are decreased to reduce the difference in the degree of penetration in the portion in which the distance Lmin between a unit head 12*a* and a unit head 12*b* is short and the portion in which the distance Lmax between a unit head 12*a* and a unit head 12*b* is long. In other words, in the present embodiment, the penetration rates of multiple inks are decreased by using an inorganic oxide particle to make the condition similar to that when multiple inks are allowed to penetrate simultaneously even if there is a difference between distances L.

Consequently, even if the size of a line head is configured as small as possible, the difference in the degree of penetration can be reduced, and the color difference when a recorded matter is viewed in the width direction can be reduced. The configuration of the present embodiment will now be described in detail.

1.1. Discharging Step

The discharging step is a step of discharging a first ink and a second ink from a line head having a length equal to or longer than the recording width of a recording medium to allow the inks to adhere to a recording medium. FIG. 1 shows a schematic cross-sectional view of a recording apparatus that can be used in the recording method of the present disclosure.

1.1.1. Line Head

The line head 10 is a means having a length equal to or longer than the recording width of a recording medium and discharging an ink composition to allow it to adhere onto a recording medium M. The ink jet head 10 includes a plurality of unit heads 12 aligned in the recording width direction of the recording medium on the nozzle face 11 facing the recording medium M. The unit head 12 includes nozzles for discharging an ink composition, and the nozzles may be disposed in rows. The group of nozzles arranged in rows is also referred to as "nozzle row". The recording medium M is supported by a belt B and is transported in a transport direction. The belt B is moved in the transport direction D1 by belt rollers 20. The recording apparatus may include a paper feed tray, a paper output tray, and so on (not shown in the drawing).

The unit head 12 may be any head as long as it has such a nozzle row, and the structure is not limited except that it has a nozzle row. In the line head 10, the portion where one nozzle raw is present is one unit head 12. The nozzle row is also said to be a unit head 12.

In the present embodiment, the line head 10 includes portions having different inter-nozzle distances in the scanning direction of a first nozzle that discharges a first ink and a second nozzle that discharges a second ink. Since a color difference consequently occurs, the present disclosure is particularly useful.

In a line system using a line head, for example, an ink jet head having a width equal to or larger than the recording width of a recording medium is fixed to the recording apparatus. A recording medium is moved along the scanning direction (the longitudinal direction of the recording medium, the transport direction), and in conjunction with this movement, an operation of discharging ink droplets from the nozzles of the ink jet head is performed to record an image on the recording medium.

Alternatively, the recording medium is fixed to the recording apparatus. An ink jet head having a width equal to or larger than the recording width of the recording medium is moved along the scanning direction, and in conjunction with this movement, an operation of discharging ink droplets from the nozzles of the ink jet head is performed to record an image on the recording medium. The scanning direction is the direction of operation.

In thus line system using a line head, since recording can be performed by operating the line head and the recording medium once, the printing speed can be improved.

FIGS. 2A to 2C show the first A example to first C example of the nozzle face of an ink jet head including portions having different inter-nozzle distances. Incidentally, in the present embodiment, the unit head including a first nozzle that discharges the first ink is referred to as first unit head 12*a*, the unit head including a second nozzle that discharges the second ink is referred to as second unit head 12b, and when the two are not distinguished from each other, the unit heads are simply referred to as unit head 12.

An aspect in which a first unit head 12a discharges a first ink and a second unit head 12b discharges a second ink will be exemplified below, but the aspect is merely an example.

That is, the present disclosure may include an aspect in which one unit head includes a nozzle that discharges a first ink and a nozzle that discharges a second ink without distinguishing between a first unit head and a second unit head. More specifically, when a unit head includes a plurality of nozzle rows, each nozzle row may be capable of discharging a different ink composition.

For example, the first unit head 12a and the second unit head 12b are not separately provided and may be an integrated structure. In addition, a plurality of first unit heads 12a aligned in the width direction and a plurality of second unit heads 12b aligned in the width direction are not separately provided and may be an integrated structure. A plurality of unit heads 12 constituting a line head is not separately provided and may be an integrated structure.

Also in this case, the portion where one nozzle row that discharges a first ink is present is a first unit head 12a, and a portion where one nozzle row that discharges a second ink is present is a second unit head 12b. That is, the unit head 12 is also nozzle rows.

In the drawings, although one first unit head 12a includes two nozzle rows in the scanning direction, the number of nozzle rows may be one or two or more as long as at least one nozzle row is a nozzle row that discharges a first ink. The second unit head 12b is also the same.

In the first A example shown in FIG. 2A, a first unit head 12a and a second unit head 12b are aligned in the longitudinal direction to form one unit 12', and units 12' are arranged with a gap 14 therebetween such that the longitudinal direction of the units 12' and the width direction D2 of the line head are parallel to each other. A plurality of rows of such units 12' is arranged also in the scanning direction side with the positions of joints 13 shifted such that the positions of the joints 13 in the width direction D2 do not overlap with one another. Incidentally, it can also be said that a plurality of rows of the units 12' is arranged also in the scanning direction side with the positions of the gaps 14 sifted such that the positions of the gaps 14 in the width direction D2 do not overlap with one another.

In the first A example shown in FIG. 2A, a portion indicated by Lmin configured such that the first unit head 12a and the second unit head 12b are close to each other in the scanning direction and a portion indicated by Lmax configured such that the first unit head 12a and the second unit head 12b are far from each other in the scanning direction can be generated. Consequently, at least, portions having different inter-nozzle distances in the scanning direction of a first nozzle that discharges a first ink and a second nozzle that discharges a second ink can be generated.

The Lmin portion and the Lmax portion are inevitably generated at least at portions other than the joints 13.

The joint 13 is a portion in which the positions of nozzle rows of two first unit heads 12a or two second unit heads 12b overlap with each other in the scanning direction. Two unit heads 12 are aligned in the width direction so that such nozzles of the joint 13 are present. In one joint 13, the number of nozzles per one first unit head 12 is one or more and may be, for example, but not limited to, one to ten.

The Lmin portion and the Lmax portion are generated in portions in which the positions of the nozzle rows of two first unit heads 12a do not overlap with each other in the scanning direction and in which the positions of the nozzle rows of two second unit heads 12b do not overlap with each other in the scanning direction.

It is possible to control discharging through the nozzles of the joint 13, i.e., using the nozzles of one of two unit heads 12, the nozzles of the other of the unit heads 12, or the nozzles of both unit heads 12.

For example, concentration unevenness of the joint 13 can be reduced by using the nozzles of both unit heads 12. In this case, among the nozzles in the joint 13, nozzles between which the distance is different from the distance between other nozzles can be generated.

Alternatively, it is also possible to use only the nozzles of one of the unit heads 12 or only the nozzles of the other of the unit heads 12. In this case, the joint 13 is the Lmin portion or the Lmax portion.

In the example shown in FIG. 2A, the portion where the positions of two first unit heads 12a overlap with each other and the portion where the positions of two second unit heads 12b overlap with each other in the scanning direction, that is, the length of the joint 13 in the width direction is relatively long compared to the example of FIG. 2B. Consequently, the number of the unit heads 12 necessary for constituting a line head can be reduced, which is beneficial.

In the first B example shown in FIG. 2B, a first unit head 12a and a second unit head 12b are aligned in the longitudinal direction to form one unit 12', and units 12' are arranged without a gap such that the longitudinal direction of the units 12' is parallel to the width direction D2 of the line head. A plurality of rows of the units 12' is also arranged in the scanning direction side while shifting the positions of the joints 13 such that the positions of the joints 13 do not overlap with each other in the scanning direction D1.

In the first B example shown in FIG. 2B, a portion exhibiting an Lmin constituted such that the first unit head 12a and the second unit head 12b are close to each and a portion indicated by Lmax constituted such that the first unit head 12a and the second unit head 12b are far from each other in the scanning direction can be generated. Consequently, at least, portions having different inter-nozzle distances in the scanning direction of a first nozzle that discharges a first ink and a second nozzle that discharges a second ink can be generated.

In the example shown in FIG. 2B, portions where the positions of two first unit heads 12a overlap with each other and portions where the positions of two second unit heads 12b overlap with each other in the scanning direction are relatively large compared to the example of FIG. 2A to give a portion where the length of the joint 13 in the width direction is long. In addition, a gap 14 is unlikely to occur to provide excellent strength of the line head, which is beneficial.

In the first C example described in FIG. 2C, a first unit head 12a and a second unit head 12b are aligned in the longitudinal direction to form one unit 12', and units 12' are arranged in the width direction D2 such that the longitudinal direction of the units 12' diagonally cross the width direction D2 of the line head. In FIG. 2C, a gap is formed between the diagonally aligned adjacent units 12'. Instead of this, the units 12' may be arranged so as to be adjacent to each other without having a gap.

A first nozzle group consisting of a plurality of first nozzles that discharge a first ink and a second nozzle group consisting of a plurality of second nozzles that discharge a second ink may be arranged diagonally or parallel to the direction of the recording width. Consequently, the apparent nozzle density in the width direction of the whole line head and the number of unit heads necessary for constituting a line head having a predetermined distance in the width direction change.

When the arrangement diagonal to the width direction D2 as in the example of FIG. 2C and the arrangement parallel to the width direction D2 as in the example of FIG. 2A are compared, even if a first unit head 12a and a second unit head 12b having the same nozzle density are used, the nozzle density in the width direction as the whole line head is higher in the arrangement diagonal to the width direction D2 as in the example of FIG. 2C. That is, the nozzle density is improved by the arrangement diagonal to the width direction D2 as in the example of FIG. 2C. Accordingly, the recording resolution is high and the image quality is excellent, which are beneficial. In this case, since the distance between nozzles in the scanning direction is further elongated, the present disclosure is particularly useful.

On the other hand, in the arrangement parallel to the width direction D2 as in the example of FIG. 2A, the number of the unit heads necessary for constituting a line head having a predetermined distance in the width direction decreases, which is beneficial. In addition, the length of the whole line head in the scanning direction can be decreased, which is beneficial. Accordingly, it is possible to further reduce the size of the line head.

In the first C example shown in FIG. 2C, a portion indicated by Lmax constituted such that the first unit head 12a and the second unit head 12b are far from each other in the scanning direction can be generated. In addition, a portion indicated by Lmin constituted such that the first unit head 12a and the second unit head 12b are close to each other can be generated. Consequently, at least, portions having different inter-nozzle distances in the scanning direction of a first nozzle that discharges a first ink and a second nozzle that discharges a second ink can be generated.

In order to compare to an ink jet head including portions having different inter-nozzle distances, an ink jet head not including portions having different inter-nozzle distances will also be described. FIGS. 3A to 3C show second A example to second C example of the nozzle face of an ink jet head not including portions having different inter-nozzle distances.

In the second A example shown in FIG. 3A, in the joint 13 in the width direction D2, two or more first unit heads 12a are arranged alternately so as to overlap in the scanning direction D1. In addition, in the joint 13 in the width direction D2, two or more second unit heads 12b are arranged alternately so as to overlap in the scanning direction D1. Consequently, the distances L between nozzles are constant at every position. In addition, in the joint 13 where the first unit heads 12a are arranged alternately so as to overlap in the scanning direction D1, an ink may be discharged from any of the first unit head 12a.

For example, in the joint 13 shown in the drawing, when the nozzles of the first unit head 12a positioned at the upper side of the drawing are used, at the same position in the width direction, the nozzles of the second unit head 12b positioned at the upper side of the drawing are used. Alternatively, in the joint 13 shown in the drawing, when the nozzles of the first unit head 12a positioned at the lower side of the drawing are used, at the same position in the width direction, the nozzles of the second unit head 12 positioned at the lower side of the drawing are used. Consequently, the distances L between nozzles of the first unit head 12a and second unit head 12b in the scanning direction D1 are equal at every position in the width direction.

In examples of FIGS. 3A to 3C, the joint 13 of the first unit head 12a and the joint 13 of the second unit head 12b are at the same position in the width direction. In addition, in the portions other than the joints 13, the distances between nozzles are constant.

Consequently, the distances L between the nozzles of the first unit head 12a and second unit head 12b in the scanning direction D1 can be adjusted to be equal at every position in the width direction.

In the second B example shown in FIG. 3B, a first unit head 12a and a second unit head 12b aligned in the scanning direction D1 to form one unit 12'. Two or more units 12' are alternately arranged so as to overlap in the scanning direction D1 at the joint 13 in the width direction D2. Consequently, the distances L between nozzles are constant at every position. In addition, in the joint 13 where the first unit heads 12a are arranged alternately so as to overlap in the scanning direction D1, an ink may be discharged from any of the first unit head 12a.

In the second C example shown in FIG. 3C, the first unit heads 12a are arranged in the width direction D2 such that the longitudinal direction of the first unit heads 12a diagonally cross the width direction D2 of the line head. In addition, the second unit heads 12b are arranged in the width direction D2 such that the longitudinal direction of the second unit heads 12b diagonally cross the width direction D2 of the line head. Consequently, the distances L between nozzles are constant at every position. In addition, in the joint 13 where the first unit heads 12a are arranged alternately so as to overlap in the scanning direction D1, an ink may be discharged from any of the first unit head 12a.

However, in the second A example to second C example shown in FIGS. 3A to 3C, it is necessary to provide a considerable amount of the gap 14 in order not to provide portions having different inter-nozzle distances in every example. Consequently, the result is that miniaturization of the head is not achievable.

Incidentally, for example, in FIG. 3A, pro forma, the distance between a first nozzle that discharges a first ink and a second nozzle that discharges a second ink when the first nozzle n1 and the second nozzle n2 are controlled to discharge inks is different from the distance when the first nozzle n3 and the second nozzle n4 are controlled to discharge inks. However, in the present embodiment, the phrase "the distance between a first nozzle that discharges a first ink and a second nozzle that discharges a second ink is different" does not mean the case of "the distance between a first nozzle that discharges a first ink and a second nozzle that discharges a second ink is different" by the above control and the case of "the distance between a first nozzle that discharges a first ink and a second nozzle that discharges a second ink is not different". In the present embodiment, the phrase "the distance between a first nozzle that discharges a first ink and a second nozzle that discharges a second ink is different" means a configuration of a line head in which no matter how the discharge is controlled, "the distance between a first nozzle that discharges a first ink and a second nozzle that discharges a second ink is different" is unavoidable, as shown in FIGS. 2A to 2C.

In the present embodiment, when focusing on the nozzles that actually discharge inks during recording, first nozzles that discharge a first ink and second nozzles that discharges a second ink are provided such that the distance between a first nozzle that discharges a first ink and a second nozzle that discharges a second ink is different from the distance between another first nozzle and another second nozzle.

Alternatively, in the present embodiment, during recording, first nozzles that discharge a first ink and second nozzles that discharge a second ink are provided such that the differences in time between the landing of the first ink discharged by a first nozzle and the landing of the second ink discharged by a second nozzle on a recording medium are different from each other.

In portions having different inter-nozzle distances, the difference in distance between nozzles, (Lmax−Lmin), may be 5 mm or more and 150 mm or less. Furthermore, the difference may be 5 to 100 mm, 5 to 80 mm, 10 to 50 mm, 15 to 50 mm, 15 to 30 mm, or 15 to 20 mm.

When the difference in distance between nozzles is 5 mm or more, since an uneven color difference is likely to occur, the present disclosure is further useful. In contrast, when the difference in distance between nozzles is less than the above, uneven color difference tends to be unlikely to occur.

In the portion where the distance between nozzles is long and the portion where the distance between nozzles is short, the distances (Lmax and Lmin) between nozzles may be each 5 mm or more and 100 mm or less and may be 10 to 50 mm.

The difference between the landing time difference (Imax) between the first ink discharged from a first nozzle and the second ink discharged from a second nozzle at a portion where the distance between the first nozzle and the second nozzle in the scanning direction is long and the landing time difference (Imin) between the first ink discharged from a first nozzle and the second ink discharged from a second nozzle at a portion where the distance between the first nozzle and the second nozzle in the scanning direction is short, (Imax−Imin), may be 5 milliseconds or more and 100 milliseconds or less and may be 10 to 50 milliseconds, 15 to 40 milliseconds, or 20 to 30 milliseconds.

In addition, the difference (Imax) in ink landing time between the first ink discharged from a first nozzle and the second ink discharged from a second nozzle at a portion where the distance between the nozzles is long and the difference (Imin) in ink landing time between the first ink discharged from a first nozzle and the second ink discharged from a second nozzle at a portion where the distance between the nozzles is short may each be 5 milliseconds or more and 100 milliseconds or less and may be 10 to 50 milliseconds, 15 to 40 milliseconds, or 20 to 30 milliseconds.

The recording medium scanning speed may be 1000 mm/s or less, 800 mm/s or less, or 600 mm/s or less. In addition, the recording medium scanning speed may be 50 mm/s or more, 100 mm/s or more, or 300 mm/s or more.

An increase of the recording medium scanning speed shortens the difference in the landing time between the first ink and the second ink and tends to suppress color difference, but has a risk of causing other problems such as landing position deviation. In addition, since a slower recording medium scanning speed tends to cause uneven color difference, the present disclosure is more useful.

The nozzle density of the nozzle row of the unit head 12 may be 50 npi or more and may be 1000 npi or less. Furthermore, the nozzle density may be 100 to 800 npi, 200 to 600 npi, or 300 to 500 npi.

The nozzle density in the width direction of the recording apparatus may be in the same range as above. When the heads are arranged diagonally to the width direction D2 as the example shown in FIG. 2C, the nozzle density in the width direction of the recording apparatus is the apparent nozzle density in the width direction. The nozzle density is the nozzle density of a nozzle row that discharges one ink.

The recording apparatus 100 of the present embodiment is not particularly limited as long as it can discharge a first ink and a second ink having color material compositions different from each other with one line head, and may have an independent ink jet head 10 for each color, such as cyan, magenta, yellow, black, and white. One ink jet head 10 may be configured to be able to discharge ink compositions of two or more colors.

Examples of the system for discharging an ink composition from a nozzle include a method for discharging a composition filled in a pressure-generating chamber of an ink jet head from a nozzle by driving a pressure-generating means and a method for discharging by applying thermal energy. These discharging methods are also referred to as ink jet methods. The method of applying a pressure to the ink composition in a nozzle is not particularly limited, and examples thereof include a piezoelectric system in which liquid droplets of an ink composition are discharged with a piezoelectric element and a thermal system in which liquid droplets are discharged by heating.

1.1.2. Ink

The first ink and the second ink are not particularly limited as long as that they contain color materials and inorganic oxide particles and that the color materials have compositions different from each other, and may further include water, a water-soluble organic solvent, a lactam compound, a resin emulsion, a surfactant, a pH adjuster, and so on as needed. The phrase "color materials having compositions different from each other" means, for example, that the colors themselves are different as in a relationship between cyan and magenta, that is, the types of color materials contained are different from each other and the colors of recorded matters obtained when adhered to a recording medium are different from each other or that even if the color systems are the same as in dark cyan and light cyan, the types, concentrations (contents), or the like of the color materials are different and the color concentrations of recorded matters obtained when adhered to a recording medium are different from each other, and is any of them and may be that the colors themselves are different.

Each component will now be described. The components exemplified below can be used in both the first ink and the second ink, unless otherwise mentioned.

1.1.2.1. Color Material

The color material is not particularly limited as long as the compositions of the color materials of the first ink and second ink are different from each other, and examples thereof include pigments and dyes. Among them, pigments may be used. The color materials may be used alone or in combination of two or more.

One of or both the first ink and the second ink may be chromatic color inks. In a chromatic color ink, since a color difference is more likely to occur, the present disclosure is particularly useful.

The content of the color material may be 0.5 to 15 mass %, 1.0 to 10 mass %, or 2.0 to 7.0 mass % as solid content with respect to the total mass of the first ink. When the content of the color material is within the above range, the color development and the clogging recovery tend to be further improved.

The content of the color material may be 0.5 to 15 mass %, 1.0 to 10 mass %, or 2.0 to 7.0 mass % as solid content with respect to the total mass of the second ink. When the content of the color material is within the above range, the color development and the clogging recovery tend to be further improved.

1.1.2.1.1. Pigment

One of or both the first ink and the second ink may contain a pigment as the color material. The pigment is not particularly limited. For example, organic pigments, such as azo pigments (including, e.g., azo lake, an insoluble azo pigment, a condensed azo pigment, and a chelate azo pigment), polycyclic pigments (e.g., a phthalocyanine pigment, a perylene pigment, a perinone pigment, an anthraquinone pigment, a quinacridone pigment, a dioxazine pigment, a thioindigo pigment, an isoindolinone pigment, and a quinophthalone pigment), nitro pigments, nitroso pigments, and aniline black; inorganic pigments, such as carbon black (e.g., furnace black, thermal lamp black, acetylene black, and channel black), metal oxides, metal sulfides, and metal chlorides; and extender pigments, such as calcium carbonate and talc, can be used.

The pigment may be added to an ink as a pigment dispersion obtained by dispersing the pigment in water with a dispersant or as a pigment dispersion obtained by dispersing, in water, a self-dispersion type surface-treated pigment having a hydrophilic group introduced to the pigment particle surface by a chemical reaction (hereinafter, also referred to as "self-dispersing pigment") or obtained by dispersing, in water, a pigment coated with a polymer (hereinafter, also referred to as "resin dispersion pigment"). In particular, a self-dispersing pigment may be contained in the ink. The use of a self-dispersing pigment tents to further improve the water repellency of the nozzle plate and intermittent printing stability.

The pigments and dispersants constituting the pigment dispersion may be each used alone or in combination of two or more.

1.1.2.1.2. Dye

The dye is not particularly limited, and examples thereof include acid dyes, such as C.I. Acid Yellow, C.I. Acid Red, C.I. Acid Blue, C.I. Acid Orange, C.I. Acid Violet, and C.I. Acid Black; basic dyes, such as C.I. Basic Yellow, C.I. Basic Red, C.I. Basic Blue, C.I. Basic Orange, C.I. Basic Violet, and C.I. Basic Black; direct dyes, such as C.I. Direct Yellow, C.I. Direct Red, C.I. Direct Blue, C.I. Direct Orange, C.I. Direct Violet, and C.I. Direct Black; reactive dyes, such as C.I. Reactive Yellow, C.I. Reactive Red, C.I. Reactive Blue, C.I. Reactive Orange, C.I. Reactive Violet, and C.I. Reactive Black; and disperse dyes, such as C.I. Disperse Yellow, C.I. Disperse Red, C.I. Disperse Blue, C.I. Disperse Orange, C.I. Disperse Violet, and C.I. Disperse Black. These dyes may be used alone or in combination of two or more.

1.1.2.2. Inorganic Oxide Particle

The inorganic oxide particle is not particularly limited, and examples thereof include silica, alumina, zirconia, titania, ceria, antimony oxide, tin oxide, tantalum oxide, zinc oxide, lead oxide, and indium oxide. In particular, at least one selected from the group consisting of silica, alumina, zirconia, titania, and ceria may be contained in the ink. The use of such an inorganic oxide particle further suppresses curling of the obtained recorded matter and further improves stacking performance. Incidentally, the inorganic oxide particle may be a single type or a combination of two or more types. The inorganic oxide particle may be a particle at least containing an inorganic oxide therein and can be a particle consisting of an inorganic oxide.

The inorganic oxide particle may be a surface-treated particle. For example, silica may be surface-treated with alumina. Consequently, the range of pH allowing silica to be stably dispersed is widened, and the dispersion stability tends to be further improved.

As the silica described above, a commercial product can also be used, and examples thereof include CATALOID series SI-45P, SI-80, SI-30P, and S-40 manufactured by JGC Catalysts and Chemicals Ltd. and SNOWTEX 20, SNOWTEX 30P, SNOWTEX 40, SNOWTEX O, SNOWTEX N, and SNOWTEX C manufactured by Nissan Chemical Corporation. Among the above-mentioned silica, from the viewpoint of further effectively and certainly causing the effects of the present disclosure, SI-45P and/or SI-80 may be used.

The volume average particle diameter of the inorganic oxide particle contained in the first ink may be 150 nm or less, 100 nm or less, or 60 nm or less. In addition, the volume average particle diameter of the inorganic oxide particle contained in the first ink may be 5 nm or more, 10 nm or more, or 15 nm or more. When the average particle diameter of the inorganic oxide particle is 150 nm or less, the color development and the clogging recovery tend to be further improved. In addition, when the average particle diameter of the inorganic oxide particle is 5 nm or more, the uneven color difference and the stacking performance tend to be further suppressed.

The volume average particle diameter of the inorganic oxide particle contained in the second ink may be 150 nm or less, 100 nm or less, or 60 nm or less. In addition, the volume average particle diameter of the inorganic oxide particle contained in the second ink may be 5 nm or more, 10 nm or more, or 15 nm or more. When the average particle diameter of the inorganic oxide particle is 150 nm or less, the color development and the clogging recovery tend to be further improved. In addition, when the average particle diameter of the inorganic oxide particle is 5 nm or more, the uneven color difference and the stacking performance tend to be further suppressed.

The average particle diameter of an inorganic oxide particle can be measured with a particle size distribution analyzer using dynamic light scattering as the measurement principle. Examples of the particle size distribution analyzer include "Zeta-potential & Particle size Analyzer ELSZ-2000ZS" (trade name) manufactured by Otsuka Electronics Co., Ltd. adopting a homodyne optical system as the frequency analysis method. Incidentally, in the present specification, the term "average particle diameter" indicates number-based average particle diameter unless otherwise specified.

The content of the inorganic oxide particle contained in the first ink may be 1.0 to 10 mass %, 1.5 to 8.0 mass %, or 2.0 to 6.0 mass % as solid content with respect to the total mass of the first ink. When the content of the inorganic oxide particle is 1.0 mass % or more, the uneven color difference and the stacking performance tend to be further improved. In addition, when the content of the inorganic oxide particle is 10 mass % or less, the color development and the clogging recovery tend to be further improved.

The content of the inorganic oxide particle contained in the second ink may be 1.0 to 10 mass %, 1.5 to 8.0 mass %, or 2.0 to 6.0 mass % as solid content with respect to the total mass of the second ink. When the content of the inorganic oxide particle is 1.0 mass % or more, the uneven color difference and the stacking performance tend to be further improved. When the content of the inorganic oxide particle is 10 mass % or less, the color development and the clogging recovery tend to be further improved.

1.1.2.3. Water

One of or both the first ink and the second ink may be an aqueous ink. The aqueous ink is an ink containing water as a main solvent component. The content of water in the aqueous ink may be 40 mass % or more or 40 to 98 mass % with respect to the total mass of the ink and further may be 45 mass % or more and 80 mass % or less, 50 mass % or more and 75 mass % or less, or 55 mass % or more and 70 mass % or less. When the content of water is 45 mass % or more, an increase in the ink viscosity is suppressed even if part of water is evaporated, and the clogging recovery tends to be further improved. In addition, when the content of water is 80 mass % or less, the stacking performance tends to be further improved.

1.1.2.4. Water-Soluble Organic Solvent

One of or both the first ink and the second ink may contain a water-soluble organic solvent. When the ink composition contains a water-soluble organic solvent, the storage stability tends to be further improved.

The water-soluble organic solvent is not particularly limited, and examples thereof include triol or higher polyols, such as glycerin; nitrogen-containing solvents, such as 2-pyrrolidone and N-methylpyrrolidone; glycols, such as ethylene glycol, diethylene glycol, triethylene glycol, propylene glycol, dipropylene glycol, tripropylene glycol, propane diol, butane diol, pentane diol, and 1,2-hexane diol; and glycol monoalkyl ether, such as ethylene glycol monomethyl ether, diethylene glycol monomethyl ether, diethylene glycol monoethyl ether, diethylene glycol monobutyl ether, triethylene glycol monobutyl ether, and triethylene glycol monomethyl ether. In particular, glycerin may be used from the viewpoint of moisturizing effect.

The content of the water-soluble organic solvent may be 0.5 to 25 mass %, 3.0 to 20 mass %, or 5.0 to 15 mass % with respect to the total mass of the ink. When the content of the water-soluble organic solvent is within the above range, the storage stability tends to be further improved.

1.1.2.5. Lactam Compound

At least one of or both the first ink and the second ink may contain a lactam compound. When the lactam compound is contained, even if the inorganic oxide particles aggregate, the resolubility thereof is further improved, and the clogging recovery tends to be further improved.

The lactam compound is not particularly limited, and examples thereof include 2-pyrrolidone, N-methyl-2-pyrrolidone, 1-(2-hydroxyethyl)-2-pyrrolidone, 3-methoxy-2-pyrrolidone, 3-acetoxy-2-pyrrolidone, 4-pentane lactam, and ε-caprolactam.

The lactam compound may be a water-soluble compound. Among lactam compounds, a water-soluble compound that is a liquid at ordinary temperature is also the above-described water-soluble organic solvent.

The lactam compound is a 3- or more-membered ring and may be a 3- to 9-membered ring or a 5- to 8-membered ring.

The content of the lactam compound contained in the first ink may be 1.0 to 10 mass %, 1.5 to 8.0 mass %, or 2.0 to 7.0 mass % with respect to the total mass of the first ink and further may be 4.0 to 6.0 mass %, 3.0 to 5.0 mass %, or 3.0 to 4.0 mass %. When the content of the lactam compound is within the above range, for example, the clogging recovery, the color difference reduction, and so on tend to be further improved.

The content of the lactam compound contained in the second ink may be 1.0 to 10 mass %, 1.5 to 8.0 mass %, or 2.0 to 7.0 mass % with respect to the total mass of the second ink and further may be 4.0 to 6.0 mass %, 3.0 to 4.0 mass %, or 3.0 to 4.0 mass %. When the content of the lactam compound is within the above range, the clogging recovery, the color difference reduction, and so on tend to be further improved.

1.1.2.6. Resin Emulsion

A resin emulsion may be further contained. The resin emulsion is not particularly limited, and examples thereof include a (meth)acrylic resin emulsion and a urethane resin emulsion. The use of such a resin emulsion further suppresses bleeding of the resulting image and tends to further improve the abrasion resistance. The resin emulsion may be used as a single type or a combination of two or more types.

The acrylic resin emulsion is not particularly limited, and examples thereof include a polymer of a (meth)acrylic monomer such as (meth)acrylic acid and (meth)acrylic acid ester and a copolymer of a (meth)acrylic monomer and another monomer, such as a styrene-acrylic resin. In particular, an anionic acrylic resin microparticle may be used.

The urethane resin emulsion is not particularly limited as long as a urethane bond is present in the molecule, and examples thereof include a polyether urethane resin having an ether bond in the main chain, a polyester urethane resin having an ester bond in the main chain, and a polycarbonate urethane resin having a carbonate bond in the main chain. In particular, an anionic urethane resin microparticle may be used.

The content of the resin emulsion may be 0.1 to 7.5 mass %, 0.3 to 5.0 mass %, or 0.5 to 3.0 mass % as solid content with respect to the total mass of the first ink. When the content of the resin emulsion is 0.1 mass % or more, the bleeding of the resulting image is suppressed, and the abrasion resistance tends also to be further improved. In addition, when the content of the resin emulsion is 7.5 mass % or less, the discharge stability tends to be further improved.

The content of the resin emulsion may be 0.1 to 7.5 mass %, 0.3 to 5.0 mass %, or 0.5 to 3.0 mass % as solid content with respect to the total mass of the second ink. When the content of the resin emulsion is 0.1 mass % or more, the bleeding of the resulting image is suppressed, and the abrasion resistance tends also to be further improved. In addition, when the content of the resin emulsion is 7.5 mass % or less, the discharge stability tends to be further improved.

1.1.2.7. Surfactant

One of or both the first ink and the second ink may contain a surfactant. The surfactant is not particularly limited, and examples thereof include an acetylene glycol-based surfactant, a fluorochemical surfactant, and a silicone-based surfactant.

The acetylene glycol-based surfactant is not particularly limited and may be one or more selected from alkylene oxide adducts of 2,4,7,9-tetramethyl-5-decine-4,7-diol and 2,4,7,9-tetramethyl-5-decine-4,7-diol and alkylene oxide adducts of 2,4-dimethyl-5-decin-4-ol and 2,4-dimethyl-5-decin-4-ol. Incidentally, the acetylene glycol-based surfactants may be used alone or in combination of two or more.

The fluorochemical surfactant is not particularly limited, and examples thereof include perfluoroalkyl sulfonates, perfluoroalkyl carboxylates, perfluoroalkyl phosphates, perfluoroalkyl ethylene oxide adducts, perfluoroalkylbetaines, and perfluoroalkylamine oxide compounds. Incidentally, the fluorochemical surfactants may be used alone or in combination of two or more.

Examples of the silicone-based surfactant include polysiloxane compounds and polyether-modified organosiloxane. Incidentally, the silicone-based surfactants may be used alone or in combination of two or more.

The content of the surfactant contained in the first ink may be 0.1 to 5.0 mass %, 0.1 to 2.0 mass %, or 0.3 to 1.5 mass % with respect to the total mass of the first ink. When the content of the surfactant is within the above range, the clogging recovery tends to be further improved.

The content of the surfactant contained in the second ink may be 0.1 to 5.0 mass %, 0.1 to 2.0 mass %, or 0.3 to 1.5 mass % with respect to the total mass of the second ink. The content further may be 0.5 to 1.3 mass % or 0.7 to 1.0 mass %.

When the content of the surfactant within the above range, the clogging recovery tends to be further improved. In addition, the color difference reduction is excellent, which is beneficial.

1.1.2.8. pH Adjuster

The pH adjuster is not particularly limited, and examples thereof include inorganic acids (e.g., sulfuric acid, hydrochloric acid, and nitric acid), inorganic bases (e.g., lithium hydroxide, sodium hydroxide, potassium hydroxide, and ammonia), organic bases (triethanolamine, diethanolamine, monoethanolamine, and tripropanolamine), and organic acids (e.g., adipic acid, citric acid, and succinic acid). In particular, an organic base may be used. The pH adjusters may be used alone or in combination of two or more.

The content of the pH adjuster contained in the first ink may be 0.1 to 2.0 mass %, 0.1 to 1.5 mass %, or 0.1 to 1.0 mass % with respect to the total mass of the first ink. When the content of the pH adjuster is within the above range, the clogging recovery tends to be further improved.

The content of the pH adjuster contained in the second ink may be 0.1 to 2.0 mass %, 0.1 to 1.5 mass %, or 0.1 to 1.0 mass % with respect to the total mass of the second ink. When the content of the pH adjuster is within the above range, the clogging recovery tends to be further improved.

1.1.3. Recording Medium

The recording medium is not particularly limited, and examples thereof include an absorbent recording medium, a low-absorbent recording medium, and a non-absorbent recording medium. In particular, the absorbent recording medium or the low-absorbent recording medium may be used, and the absorbent recording medium may be used. Since occurrence of a difference in penetration due to the difference in distance between nozzles becomes easier with an increase in the absorbency, the present disclosure is particularly useful.

Here, the term "low-absorbent recording medium" or "non-absorbent recording medium" refers to a recording medium having a water absorption amount of 10 mL/m$^2$ or less from the start of contact to 30 msec in a Bristow method. This Bristow method is a most popular method for measuring the amount of liquid absorption in a short time and is adopted also by Japan Technical Association of the Pulp and Paper Industry (JAPAN TAPPI). The details of the test method are described in the standard No. 51 "Paper and Paperboard—Liquid Absorbency Test Method—Bristow method" of the "JAPAN TAPPI Paper Pulp Test Method, 2000 Edition".

Incidentally, the low-absorbent recording medium refers to a recording medium having a water absorption amount of 5 mL/m$^2$ or more and 10 mL/m$^2$ or less. On the other hand, the absorbent recording medium refers to a recording medium having a water absorption amount exceeding 10 mL/m$^2$.

The absorbent recording medium is not particularly limited, and examples thereof include plain paper such as electrophotographic paper with high penetrability of the ink composition, ink jet paper (ink jet exclusive paper with an ink absorption layer made of silica particles or alumina particles or an ink absorption layer made of a hydrophilic polymer such as polyvinyl alcohol (PVA) or polyvinyl pyrrolidone (PVP)). Fabric is also mentioned.

The low-absorbent recording medium is not particularly limited, and examples thereof include coated paper having a coating layer for receiving oil-based ink on the surface. The coated paper is not particularly limited, and examples thereof include printing paper, such as art paper, coated paper, and matte paper.

The non-absorbent recording medium is not particularly limited, and examples thereof include films and plates of plastics such as polyvinyl chloride, polyethylene, polypropylene, polyethylene terephthalate (PET), polycarbonate, polystyrene, and polyurethane; plates of metals such as iron, silver, copper, and aluminum; metal plates and plastic films produced by deposition of such various metals and plates of alloys such as stainless steel and brass; and recording media obtained by adhesion (coating) of films of plastics, such as polyvinyl chloride, polyethylene, polypropylene, polyethylene terephthalate (PET), polycarbonate, polystyrene, and polyurethane, to paper substrates.

2.2. Transportation Step

The recording method of the present embodiment may further include a transportation step. In the transportation step, a recording medium is transported in a predetermined direction in a recording apparatus. More specifically, a recording medium is transported from the paper feed unit to the paper output unit in a recording apparatus using a transportation roller or a transportation belt provided in the recording apparatus. In the transportation process, the ink discharged from an ink jet head adheres to a recording medium to form a recorded matter. The transportation may be performed continuously or intermittently.

2. Recording Apparatus

The recording apparatus of the present embodiment includes a line head having a length equal to or longer than the recording width of a recording medium, a first ink, and a second ink. The line head includes a plurality of unit heads aligned in the direction of the recording width of the recording medium and includes portions having different inter-nozzle distances in the scanning direction of a first nozzle that discharges the first ink and a second nozzle that discharges the second ink. The first ink and the second ink contain color materials and inorganic oxide particles, and the color materials have compositions different from each other.

The recording apparatus of the present embodiment may further include a transportation means for transporting a recording medium. The transportation means is constituted of, for example, a transportation roller and a transportation belt provided in the recording apparatus.

Examples

The present disclosure will now be more specifically described using Examples and Comparative Examples. The present disclosure is not intended to be limited to the following Examples.

1. Preparation of Ink

The respective components were placed in a mixture tank such that each of the compositions shown in Table 1 was obtained and were mixed and stirred and were further filtrated through a membrane filer of 5 μm to obtain an ink jet ink of each Example. Incidentally, the numerical value of each component shown in each Example in the table represents mass % unless otherwise specified. In the table, the numerical values regarding inorganic oxide colloid and pigment dispersions represent the mass % of the solid contents.

TABLE 1

| | | Ink | | | | | | | | | |
|---|---|---|---|---|---|---|---|---|---|---|---|
| | | 1A | 1B | 1C | 1D | 1E | 1F | 1G | 1H | 1I | 1J |
| Pigment dispersion | Cyan pigment CAB-O-JET 450C (solid content) | 6.0 | 6.0 | 6.0 | 6.0 | 6.0 | 6.0 | 6.0 | 6.0 | 6.0 | 6.0 |
| Inorganic oxide particle | Silica CATALOID SI-30 (D50 = 11) (solid content) | 3.0 | — | 3.0 | 3.0 | 3.0 | — | 3.0 | 7.0 | 3.0 | 1.0 |
| | Silica CATALOID SI-45 (D50 = 45) (solid content) | — | — | — | — | — | 3.0 | — | — | — | — |
| Water-soluble organic solvent | Glycerin | 5.0 | 5.0 | 5.0 | 5.0 | 5.0 | 5.0 | 5.0 | 5.0 | 5.0 | 5.0 |
| | Triethylene glycol | 10.0 | 10.0 | 10.0 | 10.0 | 10.0 | 10.0 | 10.0 | 10.0 | 10.0 | 10.0 |
| | Triethylene glycol monobutyl ether | 1.0 | 1.0 | 1.0 | 1.0 | 1.0 | 1.0 | 1.0 | 1.0 | 1.0 | 1.0 |
| | Triethylene glycol monomethyl ether | 2.0 | 2.0 | 2.0 | 2.0 | 2.0 | 2.0 | 2.0 | 2.0 | 2.0 | 2.0 |
| | 1,2-Hexanediol | 0.5 | 0.5 | 0.5 | 0.5 | 0.5 | 0.5 | 0.5 | 0.5 | 0.5 | 0.5 |
| Lactam compound | 2-Pyrrolidone | — | — | — | 3.0 | — | — | — | — | 2.0 | — |
| | 1-(2-Hydroxyethyl)-2-pyrrolidone | — | — | 3.0 | — | — | — | — | — | — | — |
| | ε-Caprolactam | 3.0 | 3.0 | — | — | 3.0 | 3.0 | — | 3.0 | 3.0 | 3.0 |
| Resin emulsion | X-436 (solid content) | 0.3 | 0.3 | 0.3 | 0.3 | 0.3 | 0.3 | 0.3 | 0.3 | 0.3 | 0.3 |
| Surfactant | OLFINE E1010 | 0.5 | 0.5 | 0.5 | 0.5 | 0.5 | 0.5 | 0.5 | 0.5 | 0.5 | 0.5 |
| | Surfynol 104 | 0.3 | 0.3 | 0.3 | 0.3 | 0.5 | 0.3 | 0.3 | 0.3 | 0.3 | 0.3 |
| | OLFINE EXP4300 | 0.1 | 0.1 | 0.1 | 0.1 | 0.5 | 0.1 | 0.1 | 0.1 | 0.1 | 0.1 |
| pH Adjuster | Triethanolamine | 0.3 | 0.3 | 0.3 | 0.3 | 0.3 | 0.3 | 0.3 | 0.3 | 0.3 | 0.3 |
| | Water | Balance | Balance | Balance | Balance | Balance | Balance | Balance | Balance | Balance | Balance |
| | Total | 100.0 | 100.0 | 100.0 | 100.0 | 100.0 | 100.0 | 100.0 | 100.0 | 100.0 | 100.0 |

TABLE 2

| | | Ink | | | | | | | | | |
|---|---|---|---|---|---|---|---|---|---|---|---|
| | | 2A | 2B | 2C | 2D | 2E | 2F | 2G | 2H | 2I | 2J |
| Pigment dispersion | Yellow pigment CAB-O-JET 470Y (solid content) | 6.0 | 6.0 | 6.0 | 6.0 | 6.0 | 6.0 | 6.0 | 6.0 | 6.0 | 6.0 |
| Inorganic oxide particle | Silica CATALOID SI-30 (D50 = 11) (solid content) | 3.0 | — | 3.0 | 3.0 | 3.0 | — | 3.0 | 7.0 | 3.0 | 1.0 |
| | Silica CATALOID SI-45 (D50 = 45) (solid content) | — | — | — | — | — | 3.0 | — | — | — | — |
| Water-soluble organic solvent | Glycerin | 5.0 | 5.0 | 5.0 | 5.0 | 5.0 | 5.0 | 5.0 | 5.0 | 5.0 | 5.0 |
| | Triethylene glycol | 3.0 | 3.0 | 3.0 | 3.0 | 3.0 | 3.0 | 3.0 | 3.0 | 3.0 | 3.0 |
| | Triethylene glycol monobutyl ether | 1.0 | 1.0 | 1.0 | 1.0 | 1.0 | 1.0 | 1.0 | 1.0 | 1.0 | 1.0 |
| | Triethylene glycol monomethyl ether | 2.0 | 2.0 | 2.0 | 2.0 | 2.0 | 2.0 | 2.0 | 2.0 | 2.0 | 2.0 |
| | 1,2-Hexanediol | 0.3 | 0.3 | 0.3 | 0.3 | 0.3 | 0.3 | 0.3 | 0.3 | 0.3 | 0.3 |
| Lactam compound | 2-Pyrrolidone | — | — | — | 3.0 | — | — | — | — | 2.0 | — |
| | 1-(2-Hydroxyethyl)-2-pyrrolidone | — | — | 3.0 | — | — | — | — | — | — | — |
| | ε-Caprolactam | 3.0 | 3.0 | — | — | 3.0 | 3.0 | — | 3.0 | 3.0 | 3.0 |
| Resin emulsion | X-436 (solid content) | 0.3 | 0.3 | 0.3 | 0.3 | 0.3 | 0.3 | 0.3 | 0.3 | 0.3 | 0.3 |
| Surfactant | OLFINE E1010 | 0.5 | 0.5 | 0.5 | 0.5 | 0.5 | 0.5 | 0.5 | 0.5 | 0.5 | 0.5 |
| | Surfynol 104 | 0.3 | 0.3 | 0.3 | 0.3 | 0.5 | 0.3 | 0.3 | 0.3 | 0.3 | 0.3 |

TABLE 2-continued

|  |  | Ink | | | | | | | | | |
|---|---|---|---|---|---|---|---|---|---|---|---|
|  |  | 2A | 2B | 2C | 2D | 2E | 2F | 2G | 2H | 2I | 2J |
| pH Adjuster | OLFINE EXP4300 | 0.1 | 0.1 | 0.1 | 0.1 | 0.5 | 0.1 | 0.1 | 0.1 | 0.1 | 0.1 |
|  | Triethanolamine | 0.3 | 0.3 | 0.3 | 0.3 | 0.3 | 0.3 | 0.3 | 0.3 | 0.3 | 0.3 |
|  | Water | Balance | Balance | Balance | Balance | Balance | Balance | Balance | Balance | Balance | Balance |
|  | Total | 100.0 | 100.0 | 100.0 | 100.0 | 100.0 | 100.0 | 100.0 | 100.0 | 100.0 | 100.0 |

The abbreviations and product components used in Table 1 are as follows:
Pigment dispersion
Cyan pigment (CAB-O-JET 450C (manufactured by Cabot Corporation))
Yellow pigment (CAB-O-JET 470Y (manufactured by Cabot Corporation))
Inorganic oxide particle
Colloidal silica (CATALOID SI-30 (D50 = 11 nm), manufactured by JGC Catalysts and Chemicals Ltd.) Colloidal silica (CATALOID SI-45 (D50 = 45 nm), manufactured by JGC Catalysts and Chemicals Ltd.)
Water-soluble organic solvent
Glycerin
Triethylene glycol
Triethylene glycol monobutyl ether
Triethylene glycol monomethyl ether
1,2-Hexanediol
Lactam compound
2-Pyrrolidone
1-(2-Hydroxyethyl)-2-pyrrolidone
ε-Caprolactam
Resin emulsion
Styrene-acrylic resin emulsion (manufactured by Seiko PMC Corporation, X-436, Tg: 33° C., acid value: 33 mg KOH/g)
Surfactant
OLFINE E1010 (manufactured by Air Products and Chemicals, Inc., trade name, acetylene glycol-based surfactant)
Surfynol 104 (manufactured by Nissin Chemical Industry Co., Ltd., trade name, acetylene glycol-based surfactant)
OLFINE EXP4300 (manufactured by Air Products and Chemicals, Inc., trade name, acetylene glycol-based surfactant)
pH adjuster
Triethanolamine

2. Evaluation

2.1. Uneven Color Difference

LX-10050MF (manufactured by Seiko Epson Corporation) was modified to produce a line printer including each of the line heads H1 to H4 shown below and was loaded with two inks shown in Table 1 in a state of being capable of being discharged. A cyan ink was loaded in the nozzles (first nozzles) of one nozzle row of a first unit head, and a yellow ink was loaded in the nozzles (second nozzles) of one nozzle row of a second unit head.

Then, the two inks were superimposed and recorded on plain paper (Xerox P paper). Incidentally, recording was performed by attaching a dot to each pixel under conditions of an ink adhesion amount of 6 ng/dot and a recording resolution of 600×2400 dpi for each ink. The transport speed of the recording medium was 600 mm/s.

However, since the H3 head had a low nozzle density in the width direction, the recording was made with a recording resolution of 300×2400 dpi.

Example 11 was different from Example 1 in distance between colors and so on by adjusting the transport speed of the recording medium to 300 mm/s.

Incidentally, the structures of line heads H1 to H4 were as follows:
Line head H1: Line head having a nozzle face 11 shown in FIG. 2C, with an apparent nozzle density of 600 npi in the width direction;
Line head H2: Line head having a nozzle face 11 shown in FIG. 3C, with an apparent nozzle density of 600 npi in the width direction;
Line head H3: Line head having a nozzle face 11 shown in FIG. 2A, with a nozzle density of 300 npi in the width direction; and
Line head H4: Line head having an enlarged distance between the first nozzle and the second nozzle by enlarging the slant with respect to the width direction than that of the line head H1.

Incidentally, in each line head, the unit head 12 constituting the line head included two nozzle rows in the scanning direction as shown in the drawing. Among them, one nozzle row in the upper part of the drawing was used. The nozzle density in the width direction of the nozzle row was 300 npi, and the number of the nozzles of the nozzle row was 300. The number of nozzles in one joint 13 was set to 5 for each nozzle row of one unit head. In a joint 13, when nozzles of which the positions overlap with each other in the width direction record dots in the scanning direction, the nozzles of one unit head 12a and nozzles of the other unit head 12a were alternately used. By doing so, concentration unevenness was decreased.

In the line head H2, in a joint 13, when the first nozzles of the first unit head 12a at the lower side of the drawing were used, as the second nozzles at the same position in the width direction of the drawing, the second nozzles of the second unit head 12b at the lower side of the drawing were used. When the first nozzles of the first unit head 12a at the upper side of the drawing were used, as the second nozzles at the same position in the width direction of the drawing, the second nozzles of the second unit head 12b at the upper side of the drawing were used. Thus, there was no difference in distance between nozzles even in the joint 13.

In Table 3, the difference in distance between colors is the difference in distance between nozzles (Lmax−Lmin). The difference in time difference between colors is the difference in landing time difference (Imax−Imin).

In the green portion constituted of cyan and yellow of a recorded matter obtained as described above, the colors of the recorded matter were measured at a portion where the distance between the nozzles was long and a portion where the distance between the nozzles was short, and the color difference ΔE was calculated. In the head H2, there were no portions having long and short distances between nozzles, the color was measured at a suitable position.

Evaluation Criteria
 A: ΔE of less than 2;
 B: ΔE of 2 or more and less than 4;
 C: ΔE of 4 or more and less than 6; and
 D: ΔE of 6 or more.

Evaluation Criteria
 A: neatly aligned enough to staple (present in the tray, and the edges of the paper are neatly aligned);
 B: 20 sheets can be stacked but not neatly aligned (present in the tray, but the edges of the paper are not neatly aligned); and
 C: 20 sheets cannot be stacked (jump out from the tray).

TABLE 3

|  | Example |  |  |  |  |  |  |  |  |  |  |  | Comparative Example |  |  | Reference Example |  |
|---|---|---|---|---|---|---|---|---|---|---|---|---|---|---|---|---|---|
|  | 1 | 2 | 3 | 4 | 5 | 6 | 7 | 8 | 9 | 10 | 11 | 12 | 1 | 2 | 3 | 1 | 2 |
| First ink | 1A | 1C | 1D | 1E | 1F | 1G | 1H | 1I | 1J | 1A | 1A | 1J | 1B | 1A | 1B | 1B | 1A |
| Second ink | 2A | 2C | 2D | 2E | 2F | 2G | 2H | 2I | 2J | 2A | 2A | 2J | 2B | 2B | 2A | 2B | 2A |
| Head No. | H1 | H1 | H1 | H1 | H1 | H1 | H1 | H1 | H1 | H4 | H1 | H3 | H1 | H1 | H1 | H2 | H2 |
| Difference in distance between colors [mm] | 15 | 15 | 15 | 15 | 15 | 15 | 15 | 15 | 15 | 20 | 15 | 10 | 15 | 15 | 15 | 0 | 0 |
| Difference in time difference between colors (msec) | 25 | 25 | 25 | 25 | 25 | 25 | 25 | 25 | 25 | 33 | 50 | 16 | 25 | 25 | 25 | 0 | 0 |
| Uneven color difference | A | A | A | B | A | A | A | B | B | B | B | A | C | C | C | A | A |
| Color development | A | B | B | B | A | A | A | A | B | A | A | C | C | B | B | C | A |
| Clogging recovery | A | B | A | A | B | C | B | AA | A | A | A | A | A | A | A | A | A |
| Stacking performance | A | A | A | A | A | A | A | A | B | A | A | B | C | C | C | C | A |

2.2. Color Development

In the green portion constituted of cyan and yellow of a recorded matter obtained as described above, the color of the maximum density portion in the width direction D2 was measured with a colorimeter (manufactured by X-Rite, Inc., x-rite i1) to obtain the OD value of the portion. Based on the obtained OD value, the color development was evaluated by the following evaluation criteria.

Evaluation Criteria
 A: OD value of exceeding 1.0;
 B: OD value of higher than 0.95 and 1.0 or less;
 C: OD value of higher than 0.90 and 0.95 or less; and
 D: OD value of 0.9 or less.

2.3. Clogging Recovery

The ink cartridge of the ink jet recording apparatus used in the evaluation of uneven color difference was loaded with an ink, and it was verified that the ink can be discharged from all nozzles. Then, the ink jet head was left uncapped by shifting the head from the position of the cap provided in the printer in an environment of 40° C. for 7 days.

After the leaving, the ink in the nozzles was sucked once as cleaning of the ink jet head, and the number of nozzles that could not discharge the ink was counted. This cleaning operation was repeated until all nozzles were recovered. Based on the number of times of the cleaning when all nozzles were recovered, clogging recovery was evaluated by the following evaluation criteria. The results are shown in Table 3.

Evaluation Criteria
 AA: completely recovered by cleaning once;
 A: completely recovered by cleaning two or three times;
 B: completely recovered by cleaning four or five times; and
 C: completely recovered by cleaning six or more times.

2.4. Stacking Performance

Continuous printing on 20 sheets was performed with the ink jet recording apparatus used in the evaluation of uneven color difference, and the stacking performance when the paper was output stacked on the paper output tray was evaluated by the following evaluation criteria.

3. Evaluation Results

It was demonstrated by Reference Examples that when the line head H2 not having portions having different inter-nozzle distances of a first nozzle that discharges a first ink and a second nozzle that discharges a second ink is used, no problem of uneven color difference occurs. On the other hand, it was also demonstrated that in the line head H2 used in Reference Examples, there are many gaps, and miniaturization cannot be achieved.

It was also demonstrated by comparison between Examples and Comparative Examples that even if a head having portions having different inter-nozzle distances of a first nozzle that discharges a first ink and a second nozzle that discharges a second ink is used, uneven color difference is suppressed by using an ink composition containing an inorganic oxide particle.

What is claimed is:

1. A recording method comprising:
 a discharging step of discharging a first ink and a second ink from a line head having a length equal to or longer than a recording width of a recording medium and allowing the inks to adhere to the recording medium, wherein
 the line head includes a first line head and a second line head, the first line head includes a plurality of first unit heads aligned in a direction of the recording width of the recording medium, the second line head includes a plurality of second unit heads aligned in a direction of the recording width of the recording medium, the first unit heads include first nozzles and do not include a second nozzle, the second unit heads include second nozzles and do not include a first nozzle,
 the line head includes portions having different inter-nozzle distances in the scanning direction of the first nozzle that discharges the first ink and the second nozzle that discharges the second ink,
 the portions include a portion $L_{min}$ having a distance $L_{min}$ in the scanning direction of the first nozzles that discharge the first ink and the second nozzles that discharge the second ink, and a portion $L_{max}$ having a distance $L_{max}$ in the scanning direction of the first nozzles that discharge the first ink and the second nozzles that discharge the second ink, in the portion $L_{min}$, there is no unit head between the first nozzles that discharge the first ink and the second nozzles that discharge the second ink, in the portion $L_{max}$, there is a unit head but there is no nozzle between the first nozzles that discharge the first ink and the second nozzles that discharge the second ink, a distance in the scanning direction of the first unit head of the first nozzles that discharge the first ink and the second unit head of the second nozzles that discharge the second ink in the portion $L_{min}$ Is shorter than a distance in the scanning direction of the first unit head of the first nozzles that discharge the first ink and the second unit head of the second nozzles that discharge the second ink in the portion $L_{max}$ so that the distance $L_{min}$ is shorter than the distance $L_{max}$, the first ink and the second ink are not a white ink;

the first ink and the second ink contain color materials and inorganic oxide particles, and the color materials have compositions different from each other; and the inorganic oxide particles contained in the first ink and the second ink are at least one or more selected from the group consisting of silica, alumina, zirconia, and ceria.

2. The recording method according to claim 1, wherein in the line head, a first nozzle group consisting of the plurality of the first nozzles that discharge the first ink and a second nozzle group consisting of the plurality of the second nozzles that discharge the second ink are arranged diagonally or parallel to the recording width direction.

3. The recording method according to claim 1, wherein a content of the inorganic oxide particle contained in the first ink is 1.0 to 10 mass % with respect to the total mass of the first ink, and a content of the inorganic oxide particle contained in the second ink is 1.0 to 10 mass % with respect to the total mass of the second ink.

4. The recording method according to claim 1, wherein the inorganic oxide particle contained in the first ink has a volume average particle diameter of 100 nm or less, and the inorganic oxide particle contained in the second ink has a volume average particle diameter of 100 nm or less.

5. The recording method according to claim 1, wherein the first ink contains a lactam compound, and the second ink contains a lactam compound.

6. The recording method according to claim 5, wherein a content of the lactam compound contained in the first ink is 1.0 to 10 mass % with respect to the total mass of the first ink, and a content of the lactam compound contained in the second ink is 1.0 to 10 mass % with respect to the total mass of the second ink.

7. The recording method according to claim 1, wherein the first ink contains a surfactant, the second ink contains a surfactant, a content of the surfactant contained in the first ink is 0.1 to 2.0 mass % with respect to the total mass of the first ink, and a content of the surfactant contained in the second ink is 0.1 to 2.0 mass % with respect to the total mass of the second ink.

8. The recording method according to claim 1, wherein in the portions having different inter-nozzle distances, the difference in distance between nozzles is 5 to 80 mm.

9. The recording method according to claim 1, wherein a scanning speed of the recording medium is 600 mm/s or less.

10. The recording method according to claim 1, wherein the inorganic oxide particles contained in the first ink and the second ink are at least one or more selected from the group consisting of silica, alumina, and zirconia.

11. The recording method according to claim 1, wherein the first ink and the second ink are aqueous inks.

12. The recording method according to claim 1, wherein the first ink and the second ink are chromatic color inks.

13. The recording method according to claim 1, wherein the recording medium is an absorbent recording medium.

14. A recording apparatus conducting a recording method according to claim 1 comprising:

the line head; and the first ink and the second ink.

* * * * *